US009450644B2

(12) United States Patent
Zhang et al.

(10) Patent No.: US 9,450,644 B2
(45) Date of Patent: Sep. 20, 2016

(54) HIGHER ORDER MULTIPLE INPUT MULTIPLE OUTPUT IN ETHERNET

(71) Applicant: QUALCOMM INCORPORATED, San Diego, CA (US)

(72) Inventors: Danlu Zhang, San Diego, CA (US); Guining Shi, San Diego, CA (US); William J. McFarland, Los Altos, CA (US); Yin Huang, Beijing (CN); Gerardo Romo Luevano, San Diego, CA (US); Jae Min Shin, San Diego, CA (US); Kevin Khanh Dao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/428,318

(22) PCT Filed: Sep. 11, 2013

(86) PCT No.: PCT/CN2013/083296
§ 371 (c)(1),
(2) Date: Mar. 13, 2015

(87) PCT Pub. No.: WO2014/044138
PCT Pub. Date: Mar. 27, 2014

(65) Prior Publication Data
US 2015/0270872 A1    Sep. 24, 2015

Related U.S. Application Data

(60) Provisional application No. 61/820,095, filed on May 6, 2013, provisional application No. 61/703,173, filed on Sep. 19, 2012.

(51) Int. Cl.
*H04B 3/50* (2006.01)
*H04B 3/32* (2006.01)
*H01B 11/12* (2006.01)

(52) U.S. Cl.
CPC ............... *H04B 3/50* (2013.01); *H01B 11/12* (2013.01); *H04B 3/32* (2013.01)

(58) Field of Classification Search
CPC .. H01R 9/035; H01R 13/6585; H01R 9/032; H04L 25/0272; H01B 11/18; H01B 7/17; H04B 3/00; H04B 3/50
USPC ................................. 375/257–260, 295, 316
See application file for complete search history.

(56) References Cited

U.S. PATENT DOCUMENTS 3,159,786 A * 12/1964 Bayne .................... G01R 27/02
                                                          264/408
3,909,712 A *  9/1975 Rietz ....................... G01R 31/11
                                                          324/533

(Continued)

FOREIGN PATENT DOCUMENTS

CN          102044315 A          5/2011
CN          201994132 U          9/2011

(Continued)

OTHER PUBLICATIONS

Foubert W., et al., "Modeling and validation of the parameters of a Quad Cable for Common Mode DSL Applications," In proceeding of: 2nd International Conference on Signal Processing and Communication Systems, 2008, 6 pages.

(Continued)

*Primary Examiner* — Emmanuel Bayard
(74) *Attorney, Agent, or Firm* — Paradice and Li LLP

(57) ABSTRACT

A method of MIMO signal transmission on a cable is disclosed. The cable includes at least a first inner conductor, a second inner conductor, and an outer conductive shield. A first data signal is transmitted using the conductive shield and the first inner conductor. A second data signal is transmitted using at least the second inner conductor. The first and second data signals may be transmitted concurrently. For some embodiments, the second data signal may be transmitted using the first and second inner conductors. Thus, the second data signal may be a differential signal. For other embodiments, the first data signal may be transmitted using the conductive shield and the first inner conductor, and the second data signal may be transmitted using the conductive shield and the second inner conductor.

30 Claims, 13 Drawing Sheets

(56) References Cited

U.S. PATENT DOCUMENTS

| | | | | |
|---|---|---|---|---|
| 4,053,828 | A * | 10/1977 | Ambler | G01V 3/108 29/602.1 |
| 4,068,105 | A * | 1/1978 | Jain | G08B 25/04 324/500 |
| 4,215,276 | A * | 7/1980 | Janeway | G08C 15/00 307/115 |
| 4,691,349 | A * | 9/1987 | Reichel | H04B 3/00 379/391 |
| 5,418,878 | A | 5/1995 | Sass et al. | |
| 5,890,214 | A * | 3/1999 | Espy | G06F 11/3034 710/302 |
| 5,901,151 | A * | 5/1999 | Bleiweiss | G06F 11/3034 370/200 |
| 6,910,897 | B2 * | 6/2005 | Driscoll | H01R 24/50 174/36 |
| 7,035,611 | B2 * | 4/2006 | Garlepp | H04B 1/0003 333/124 |
| 7,315,592 | B2 | 1/2008 | Tsatsanis et al. | |
| 7,385,466 | B2 * | 6/2008 | Suenaga | H01F 17/06 333/12 |
| 8,008,986 | B2 | 8/2011 | Peyton et al. | |
| 8,175,172 | B2 * | 5/2012 | Yamamoto | H04L 12/10 375/257 |
| 8,549,331 | B2 * | 10/2013 | Karam | H04L 1/22 713/300 |
| 9,063,241 | B2 * | 6/2015 | Hernandez-Marti | G01V 1/22 |
| 2005/0285706 | A1 * | 12/2005 | Hall | E21B 17/028 336/132 |
| 2007/0069717 | A1 * | 3/2007 | Cheung | H03F 3/211 324/750.26 |
| 2007/0152653 | A1 * | 7/2007 | Roche | H04B 3/30 324/100 |
| 2012/0012358 | A1 | 1/2012 | Horan et al. | |
| 2013/0103406 | A9 * | 4/2013 | Hilderman | G10H 1/361 704/500 |
| 2014/0049359 | A1 * | 2/2014 | Riou | G06F 21/70 340/5.2 |
| 2014/0241440 | A1 * | 8/2014 | Horan | H04L 25/0272 375/257 |
| 2015/0071333 | A1 * | 3/2015 | Zhou | H04L 25/03343 375/219 |

FOREIGN PATENT DOCUMENTS

| | | |
|---|---|---|
| CN | 202159875 U | 3/2012 |
| WO | WO-2013027322 A1 | 2/2013 |

OTHER PUBLICATIONS

International Search Report and Written Opinion—PCT/CN2013/083296—ISA/EPO—Dec. 19, 2013.
Jakovljevic M., et al., "Throughput of shield twisted-pair cables using wire-shield modes in the presence of radio ingress," Digital Signal Processing, 2009 16th International Conference on Jul. 5-7, 2009, pp. 1-6.
Lee B., et al., "Binder MIMO Channels," 2004, pp. 1-31.
Supplementary European Search Report—EP13839575—Search Authority—The Hague—Apr. 8, 2016.

* cited by examiner

HIGHER ORDER MULTIPLE INPUT MULTIPLE OUTPUT IN ETHERNET

TECHNICAL FIELD

The present embodiments relate generally to twin-axial cables, and specifically to multiple-input and multiple-output (MIMO) signal transmission using twin-axial cables.

BACKGROUND OF RELATED ART

A twin-axial cable (or "twinax" cable) is a physical communication medium having two balanced inner conductors encapsulated by an outer shield. The two balanced inner conductors allow the twinax cable to be used for transmitting differential signals, while the outer shield isolates electrical signals carried on the inner conductors from external noise and interference. For example, FIG. 1 shows a conventional transmission configuration 100 for a twinax cable 110. The twinax cable 110 includes a first inner conductor 101, a second inner conductor 102, and an outer shield 103. Because the outer shield 103 isolates the inner conductors 101 and 102 from external noise and interference, it is typically coupled to ground potential. A voltage source 104, coupled between the first inner conductor 101 and the second inner conductor 102, generates differential signals for transmission through twinax cable 110. Thus, twinax cable 110 may transmit a single set of data signals using differential signaling.

Because twinax cables are relatively inexpensive, they are becoming more widely used in modern high-speed differential signal transmission applications. For example, some 10G Ethernet systems transmit differential signals over twinax cables. Although fiber optic cables can provide faster data rates than copper-based mediums, fiber optic cables are expensive and may require additional front-end transceiver circuitry to implement within a network environment. Accordingly, there is a need for a cost-effective way to increase data transmission rates of twinax cables.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for concurrently transmitting multiple data signals on a single data cable are disclosed. The data cable includes at least a first inner conductor, a second inner conductor, and an outer conductive shield. For some embodiments, the cable may be a twin-axial (twinax) cable. In the present embodiments, a first data signal may be transmitted using the conductive shield and one of the first or second inner conductors, and a second data signal may be transmitted using the other (first or second) inner conductor that is not being used to transmit the first data signal. The first and second data signals may be transmitted concurrently.

For some embodiments, the second signal may be transmitted using the first and second inner conductors. The first data signal may be transmitted by applying a first voltage between the conductive shield and one of the first or second inner conductors. The second data signal may be transmitted by applying a second voltage between the first and second inner conductors. For some embodiments, the first data signals may be transmitted as differential signals, and the second data signals may be transmitted as single-ended signals.

For other embodiments, the first data signal may be transmitted using the conductive shield and the first inner conductor, and the second data signal may be transmitted using the conductive shield and the second inner conductor. The first data signal may be generated by applying a first voltage between the conductive shield and the first inner conductor. The second data signal may be generated by applying a second voltage between the conductive shield and the second inner conductor.

Further, for some embodiments, an encoder may receive a set of data intended for transmission via the first and second inner conductors. The encoder may then partition the set of data into first and second subsets, and generate the first and second data signals based on the first and second subsets of data, respectively.

Accordingly, the various signal transmission techniques described herein with respect to the exemplary embodiments may provide higher data rates for data cables than conventional data transmission techniques. In addition, at least some of the present embodiments may allow for more relaxed requirements on transceiver performance and/or cable loss when transmitting at lower data rates.

BRIEF DESCRIPTION OF THE DRAWINGS

The present embodiments are illustrated by way of example and are not intended to be limited by the figures of the accompanying drawings, where.

DETAILED DESCRIPTION

In the following description, numerous specific details are set forth to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

Figure 2:
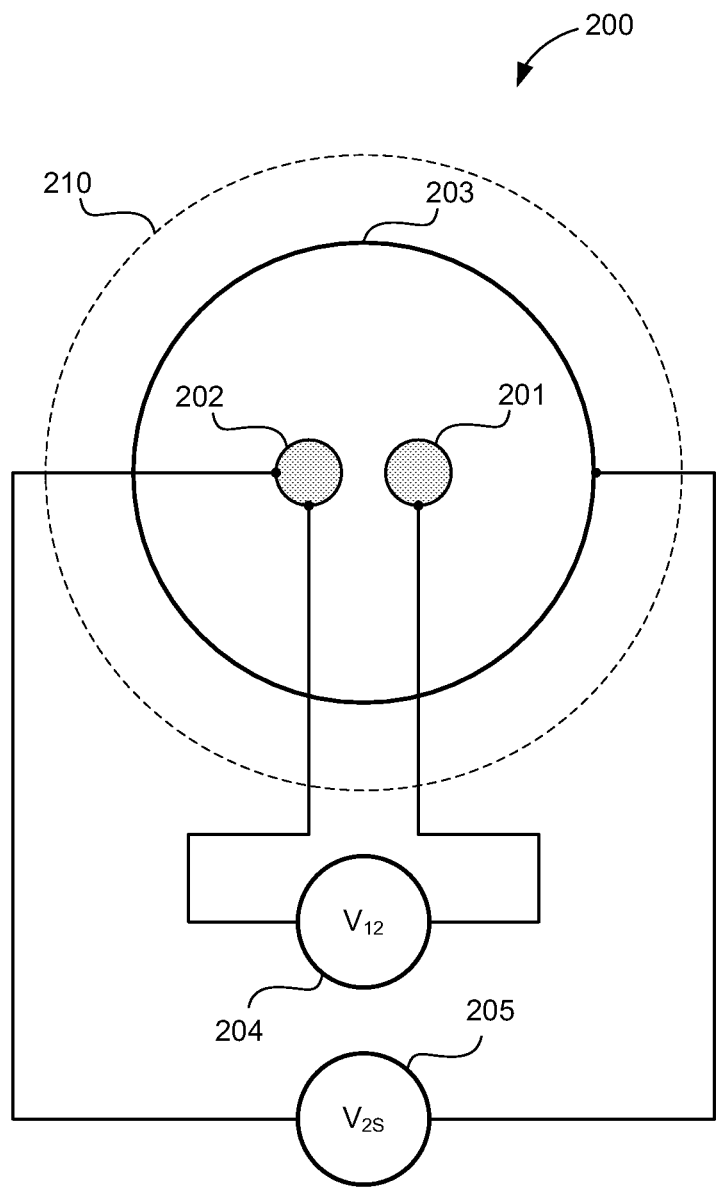
FIG. 2 is a cross-sectional illustration of a MIMO transmission configuration for a twinax cable in accordance with some embodiments.

FIG. 2 is a cross-sectional illustration of a MIMO transmission configuration 200 for a twinax cable 210 in accordance with some embodiments. The twinax cable 210 includes a first inner conductor 201, a second inner conductor 202, and an outer conductive shield 203. A first voltage source 204 is coupled between the first inner conductor 201 and the second inner conductor 202 of twinax cable 210. A second voltage source 205 is coupled between the second inner conductor 202 and the conductive shield 203 of twinax cable 210.

A first set of data signals (e.g., corresponding to a first subset of data) may be generated by first voltage source 204 and transmitted over twinax cable 210 using the two inner conductors 201 and 202. More specifically, the first voltage source 204 may generate a first voltage $V_{12}$ between the first and second inner conductors 201 and 202. The first voltage $V_{12}$ is thus translated into the first set of data signals. For some embodiments (e.g., wherein the first and second inner conductors 201 and 202 are substantially symmetrical), the first set of data signals may be transmitted on twinax cable 210 using differential signaling over the first and second inner conductors 201 and 202.

A second set of data signals (e.g., corresponding to a second subset of data) may be generated by second voltage source 205 and transmitted over twinax cable 210 using the second inner conductor 202 and the conductive shield 203. More specifically, the second voltage source 205 may generate a second voltage $V_{2S}$ between the second inner conductor 202 and the conductive shield 203. The second voltage $V_{2S}$ is thus translated into the second set of data signals. For some embodiments, the second set of data signals may be transmitted via the second inner conductor 202 and the conductive shield 203 using single-ended (i.e., non-differential) signaling techniques. For example, the voltage of the conductive shield 203 may be used as a reference potential for voltages applied to the second inner conductor 202. Alternatively, the voltage of the second inner conductor 202 may be used as a reference potential for voltages applied to conductive shield 203.

Accordingly, the twinax transmission configuration 200 illustrated in FIG. 2 may allow for differential data signaling using the two inner conductors 201 and 202 concurrent with single-ended data signaling using the second inner conductor 202 and the conductive shield 203. The ability to use conductive shield 203 as a transmission medium provides an additional degree of freedom, for example, as compared to coax cables and/or conventional twinax transmission techniques.

In addition, the twinax transmission configuration 200 of FIG. 2 may also relax the requirements on transceiver performance and cable loss, particularly at higher data rates. For example, if the bandwidth of twinax cable 210 is denoted as W, the total transmit power is denoted as P, and the additive white Gaussian noise with noise spectral density is denoted as $N_0$, then the upper bound on the achievable data rate ($R_1$) when using single-stream transmission techniques may be expressed as $R_1=W \log_2 (1+P/N_0)$. In contrast, when using two-stream transmission techniques in accordance with some of the present embodiments (assuming each stream is transmitted as half of the power and ignoring inter-stream interference), then the upper bound on the achievable data rate ($R_2$) may be expressed as $R_2=2 W \log_2 (1+P/2N_0)$. Thus, when the signal to noise ratio ($P/N_0$) is high, then $R_2>R_1$. Alternatively, transmission techniques in accordance with some of the present embodiments may achieve the same data rate as single-stream transmission techniques (e.g., $R_2=R_1$) with either lower receiver noise ($N_0$) and the same total transmit power (P), or with lower total transmit power and the same receiver noise. Although the inter-stream interference may reduce transceiver gain for actual implementations of some of the present embodiments, interference suppression and/or cancellation schemes may be used to preserve the integrity of the multiple sets of data signals transmitted by some of the present embodiments.

Figure 1:
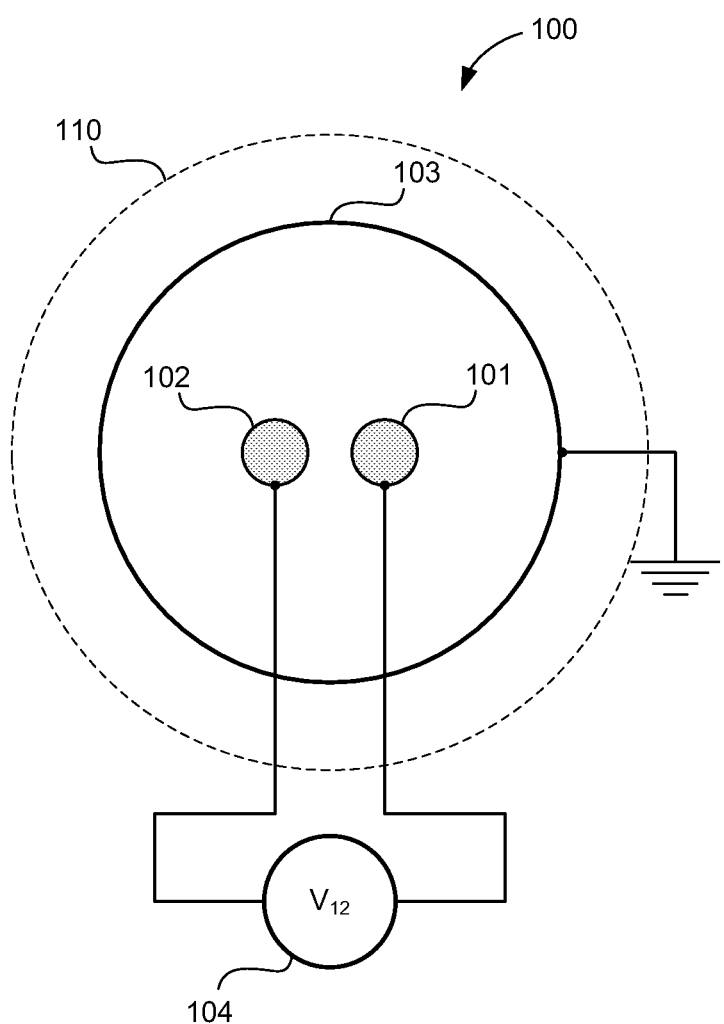
FIG. 1 is a cross-sectional illustration of a conventional transmission configuration for a twinax cable.

For some embodiments, architectural similarities between twinax cable 210 of FIG. 2 and twinax cable 110 of FIG. 1 may allow transmission techniques of the present embodiments to be readily applied to legacy networks that employ conventional twinax cables. Moreover, although conductive shield 203 may be used for data transmission in accordance with the present embodiments, conductive shield 203 may also shield the inner conductors 201 and 202 from external noise and interference.

Figure 3:
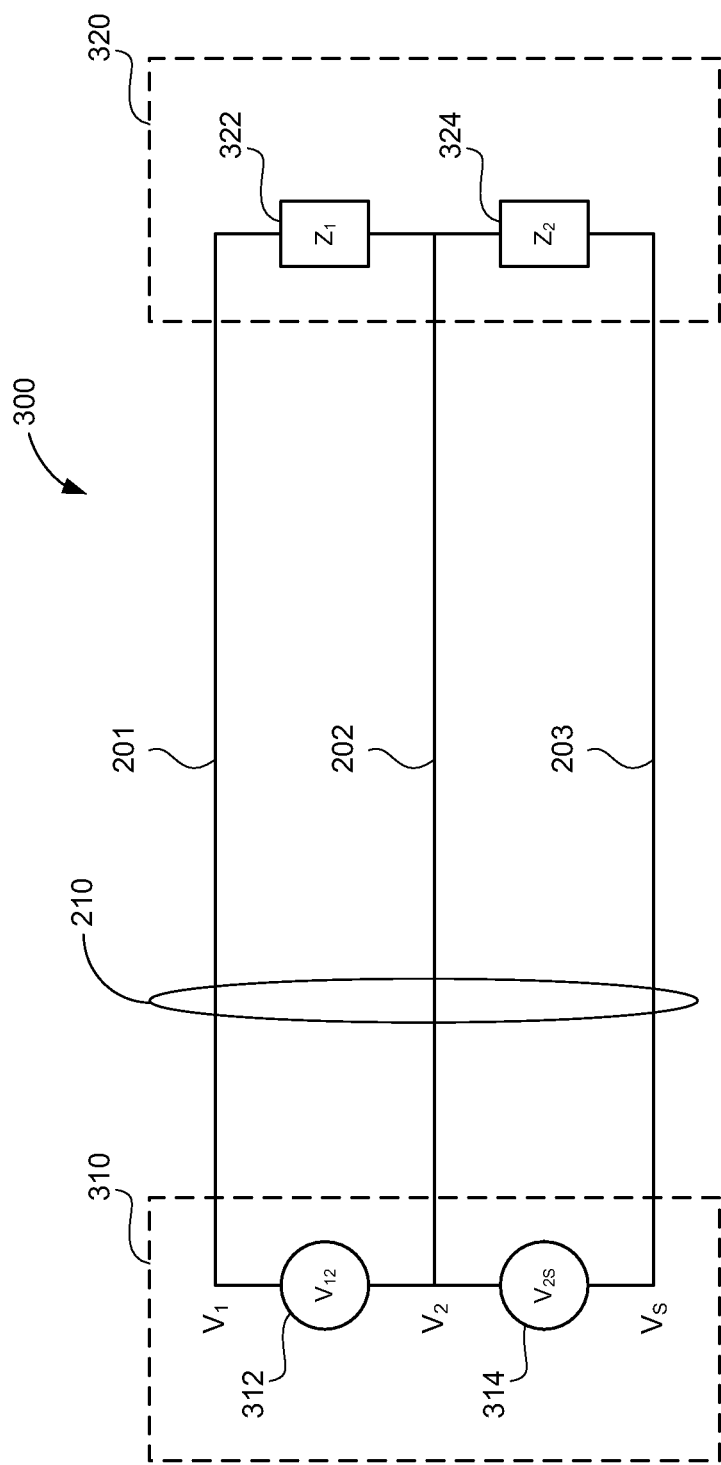
FIG. 3 is a lumped parameter model illustrating one embodiment of a system for MIMO transmission over a twinax cable.

FIG. 3 is a lumped parameter model illustrating a MIMO transmission system 300 in accordance with some embodiments. The system 300 includes twinax cable 210, a transmitter 310, and a receiver 320. Twinax cable 210 includes first inner conductor 201, second inner conductor 202, and conductive shield 203. Transmitter 310 is coupled to one end of twinax cable 210, and receiver 320 is coupled to the other end of twinax cable 210. The transmitter 310 includes voltage sources 312 and 314 to transmit data signals to the receiver 320. The receiver 320 includes detector circuits 322 and 324 to detect data signals received from the transmitter 310.

In operation, the transmitter 310 may transmit a first data signal by causing the first voltage source 312 to generate a first voltage $V_{12}$ between first and second inner conductors 201 and 202. The transmitter 310 may transmit a second data signal by causing the second voltage source 314 to generate a second voltage $V_{2S}$ between second inner conductor 202 and conductive shield 203. The receiver 320 receives these data signals by detecting the voltages on the conductors 201-203. For some embodiments (e.g., wherein the two inner conductors 201 and 202 are substantially symmetrical), the data signals transmitted by the first voltage source 312 may be a differential signal. Accordingly, the first detector 322 may detect the voltage $V_1$ on the first inner conductor 201 and add (or subtract) the voltage $V_2$ detected on the second inner conductor 202 to recover the first data signal. The second detector 324 may recover the second data signal transmitted via second inner conductor 202 and conductive shield 203 by detecting the voltage $V_2$ on the second inner conductor 202 with respect to the voltage $V_S$ on the conductive shield 203.

Note that, in the exemplary embodiment shown in FIG. 3, the voltage $V_2$ on the second inner conductor 202 may be influenced by the voltage $V_1$ on the first inner conductor 201 and/or the voltage $V_S$ on the conductive shield 203. Nonetheless, at least two degrees of freedom may still be achieved using the system 300. For example, because the transmitter 310 controls both voltage sources 312 and 314, voltage source 314 may be biased such that the voltage $V_S$ of the conductive shield 203 is held at a lower (or higher) potential than the voltage $V_2$ of the second inner conductor 202 to ensure that voltage signal $V_{2S}$ may be detected by the second detector 324 while voltage signal $V_{12}$ is detected by the first detector 322. In some embodiments, the conductive shield 203 may be grounded (e.g., $V_S=0$). Alternatively, the transmitter 310 may selectively control each of the voltage sources 312 and 314 to ensure that the transmission of data using the two inner conductors 201 and 202 does not interfere with the transmission of data using the second inner conductor 202 and the conductive shield 203.

For some embodiments, different waveforms may be generated for each of the two sets of data signals. For example, the first data signal may be transmitted using the two inner conductors 201 and 202 as a legacy baseband signal to maintain backward compatibility with legacy twinax systems, while the second data signal may be transmitted using the second inner conductor 202 and conductive shield 203 using other techniques (e.g., using OFDM symbols). Accordingly, for some embodiments, the receiver 320 may exploit different characteristics in the two sets of data signals to cancel or suppress cross-talk and interference between the signals. For other embodiments, the two sets of data signals may be transmitted using the legacy baseband signal. In either embodiment, the waveforms of the two signal streams may share the property that, in the frequency domain, their energy is allowed to cover the DC frequency. In some communication systems (such as DSL and power-line communications systems), data signals should not cover the DC frequency since the frequency band closest to DC is typically used for other purposes, for example, to carry a telephone signal and/or power. Under the present embodiments, the entire bandwidth (including DC) may be used for data signaling. In practice, it may be undesirable to use the DC frequency for carrying information due to possible heavy interference from the ambient environment. However, under present embodiments, even if a signal is carried in DC, no higher interference may be generated for other communications.

Figure 4:
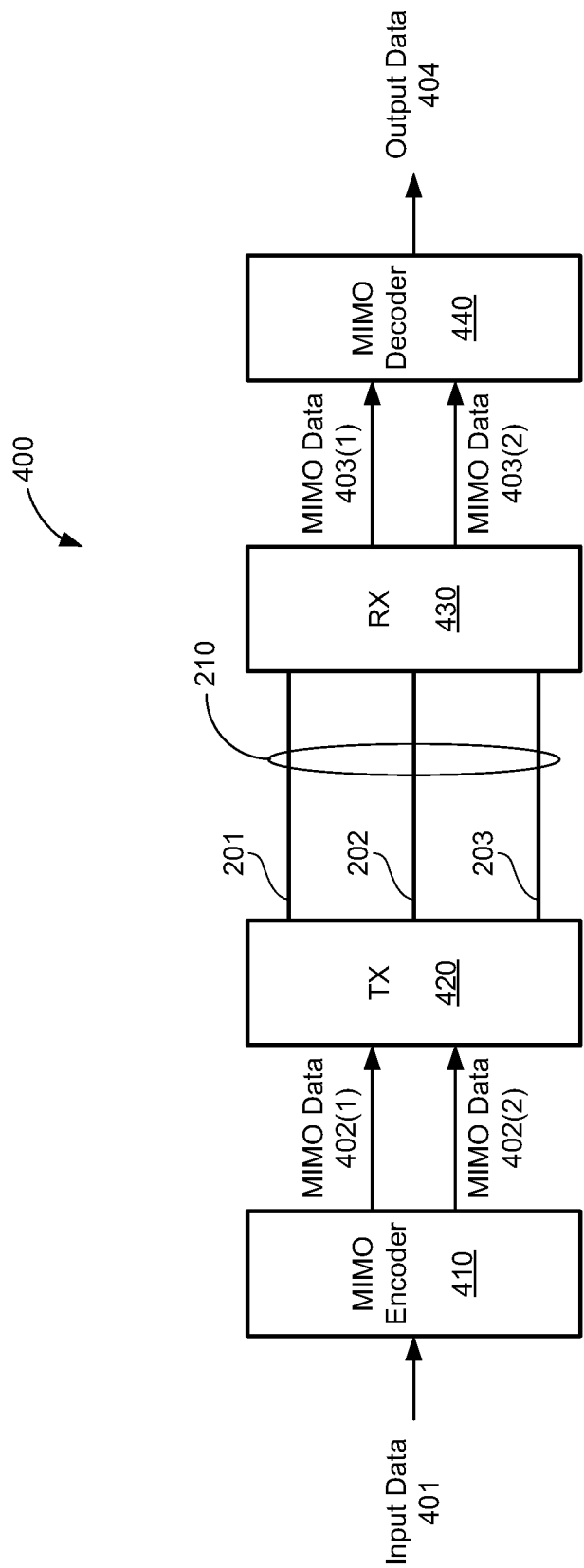
FIG. 4 is a block diagram illustrating one embodiment of a MIMO data transmission system employing twinax cables.

FIG. 4 is a block diagram of a MIMO transmission system 400 in accordance with other embodiments. The MIMO transmission system 400 includes a MIMO encoder 410, a transmitter 420, a receiver 430, and a MIMO decoder 440. A twinax cable 210, including inner conductors 201 and 202 and conductive shield 203, is coupled between the transmitter 420 and the receiver 430. Note that, in some embodiments, transmitter 420 and receiver 430 may be replaced with transceivers that are configured to both transmit and receive data signals over twinax cable 210. Such a configuration may allow for bidirectional communications via twinax cable 210.

Figure 5:
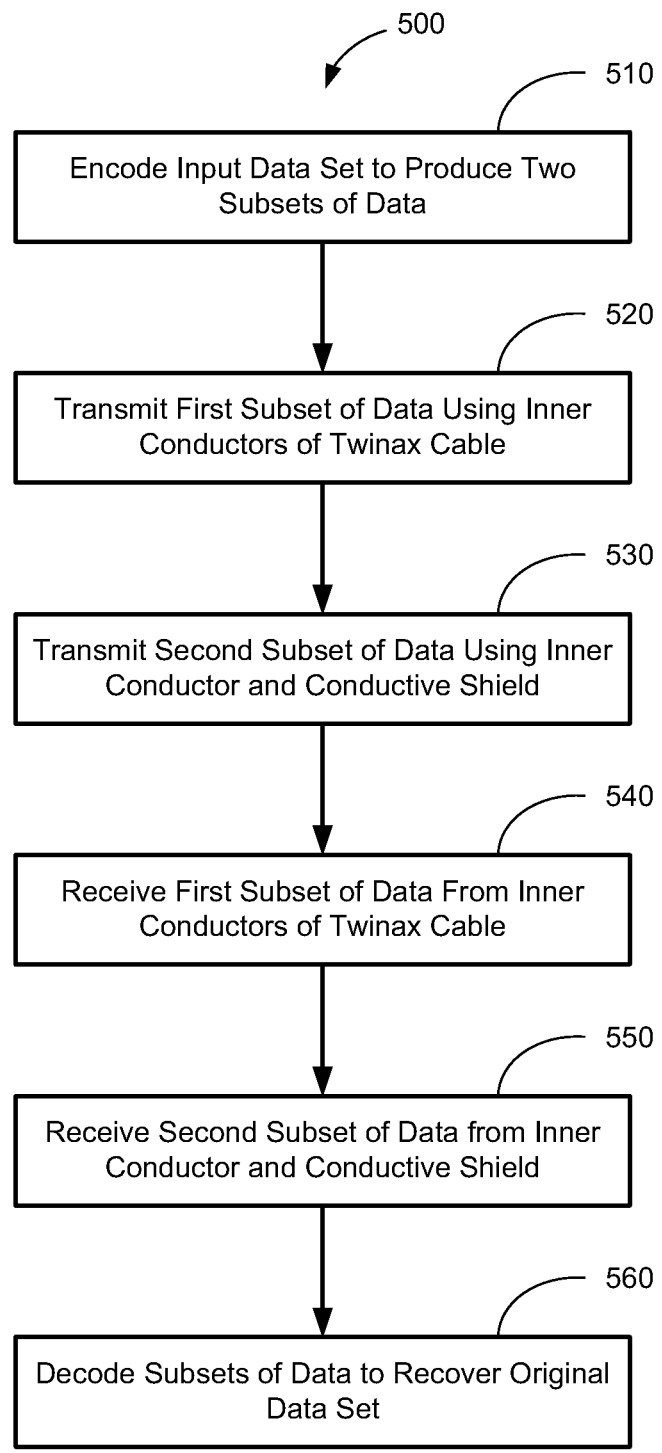
FIG. 5 is an illustrative flow chart depicting an exemplary operation for communicating MIMO signals over a twinax cable in accordance with some embodiments.

FIG. 5 is an illustrative flow chart depicting an exemplary operation 500 for communicating MIMO signals over a twinax cable in accordance with some embodiments. With reference, for example, to FIG. 4, the MIMO encoder 410 first receives, as input, a set of data 401 to be transmitted, and encodes the data set 401 to produce two subsets of data 402(1) and 402(2) (510). The set of data 401 may be intended for transmission over the two inner conductors 201 and 202 of the twinax cable 210, for example, using differential signal techniques. For some embodiments, the MIMO encoder 410 may partition the input data 401 into two subsets of data 402(1) and 402(2) which may then be transmitted over twinax cable 210 as two separate and/or parallel sets of data signals.

The transmitter 420 transmits the first subset of MIMO-encoded data 402(1) (e.g., as a first set of data signals) using the two inner conductors 201 and 202 of twinax cable 210 (520). As discussed above, with respect to FIGS. 2 and 3, the transmitter 420 may transmit the first set of data signals (e.g., as differential signals) by applying a voltage ($V_{12}$) between the two inner conductors 201 and 202. The transmitter 420 further transmits the second subset of MIMO-encoded data 402(2) (e.g., as a second set of data signals) using inner conductor 202 and conductive shield 203 (530). For example, as discussed above with respect to FIGS. 2 and 3, the transmitter 420 may apply a second voltage signal ($V_{2S}$) between the second inner conductor 202 and the conductive shield 203 to transmit a second stream of data signals (e.g., as single-ended signals). For some embodiments, the first and second sets of data signals may be transmitted concurrently.

The receiver 430 receives a first subset of MIMO-encoded data 403(1) (e.g., as the first set of data signals) via the inner conductors 201 and 202 of twinax cable 210 (540). For example, as described above with respect to FIG. 3, the receiver 430 may receive the first subset of data 403(1) by sampling the voltages between the first and second inner conductors 201 and 202. The receiver 430 further receives the second subset of MIMO-encoded data 403(2) (e.g., as the second set of data signals) via inner conductor 202 and conductive shield 203 of twinax cable 210 (550). For example, as described above with respect to FIG. 3, the receiver 430 may receive the second subset of data 403(2) by sampling the voltages between the second inner conductor 202 and the conductive shield 203.

Finally, the MIMO decoder 440 decodes the two subsets of MIMO-encoded data 403(1) and 403(2) to produce a set of output data 404 (560). For example, the MIMO decoder 440 may combine the two subsets of MIMO-encoded data 403(1) and 403(2) to recover the originally-transmitted data. For some embodiments, MIMO encoder 410 and MIMO decoder 440 may be preconfigured to use the same encoding/decoding techniques. Alternatively, MIMO encoder 410 may transmit decoding instructions to the MIMO decoder 440 prior to, or concurrently with, the transmission of data.

The MIMO system 400, as described above with reference to FIGS. 4 and 5, may be implemented by replacing and/or adding circuitry to the front end of many legacy twinax applications. Accordingly, the MIMO system 400 may provide a low-cost technique for increasing the data rate of existing twinax communication systems.

Figure 6:
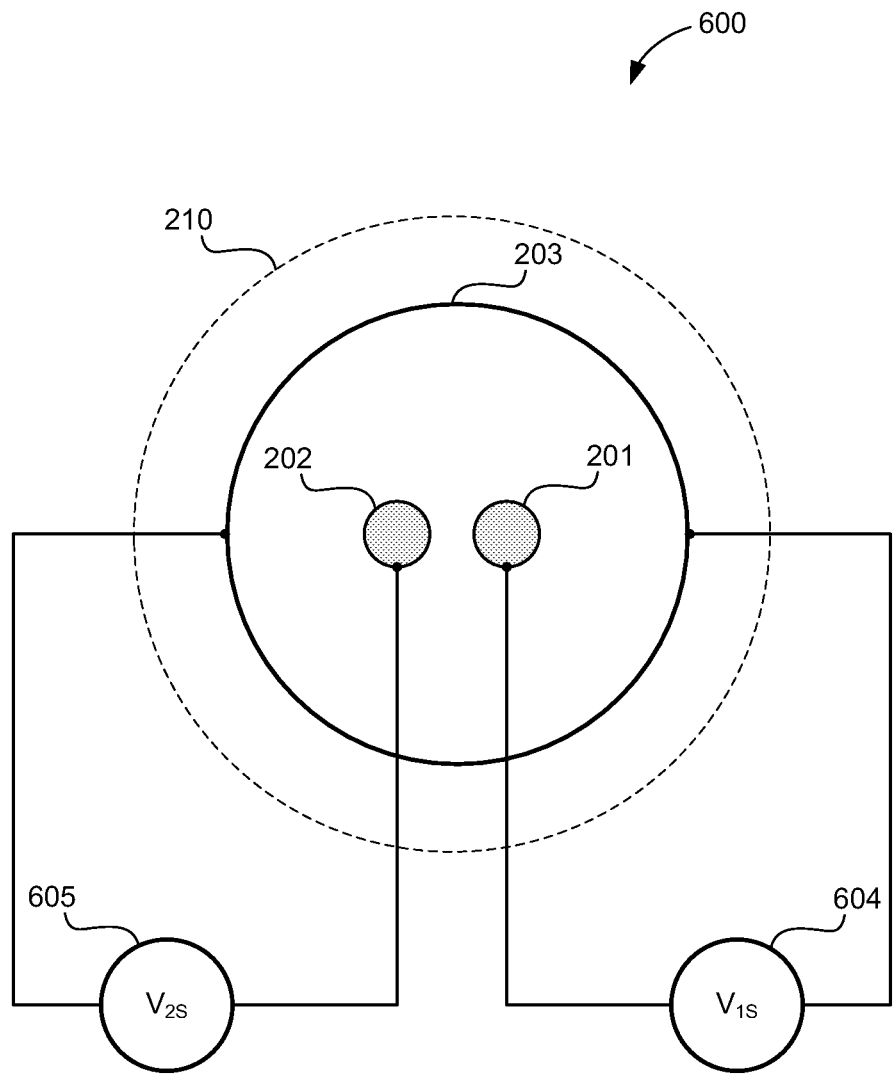
FIG. 6 is a cross-sectional illustration of a MIMO transmission configuration for a twinax cable in accordance with other embodiments.

FIG. 6 is a cross-sectional illustration of a MIMO transmission configuration 600 for twinax cable 210 in accordance with other embodiments. As described above, twinax cable 210 includes first and second inner conductors 201 and 202, and conductive shield 203. Furthermore, a first voltage source 604 is coupled between the first inner conductor 201 and the conductive shield 203, and a second voltage source 605 is coupled between the second inner conductor 202 and the conductive shield 203.

A first set of data signals may be transmitted via the first inner conductor 201 and conductive shield 203 using the first voltage source 604, for example, by applying a first voltage $V_{1S}$ between the first inner conductor 201 and the conductive shield 203. A second set of data signals may be transmitted via the second inner conductor 202 and conductive shield 203 using the second voltage source 605, for example, by applying a second voltage $V_{2S}$ between the second inner conductor 202 and the conductive shield 203.

For some embodiments, the conductive shield 203 may be used as a common return path for data signals transmitted over each of the first and second inner conductors 201 and 202. Although the inner conductors 201 and 202 may not be symmetrical with respect to the conductive shield 203, the transmission paths of the two streams of data signals are nonetheless symmetrical. This makes impedance matching easier when transmitting two parallel data signals over twinax cable 210 using the transmission configuration 600 of FIG. 6.

Furthermore, data transmitted via the first inner conductor 201 and conductive shield 203 may be represented as single-ended data signals. Similarly, data transmitted via the second inner conductor 202 and conductive shield 203 may also be represented as single-ended data signals. Thus, for some embodiments, the voltage on the conductive shield 203 may be pinned to ground since it may serve as the reference potential for the voltages on each of the first and second inner conductors 201 and 202. This may allow an additional degree of freedom when using the conductive shield 203 for data signal transmission. For example, the transmission configuration 600 may transmit two substantially symmetrical sets of data signals in parallel, thus increasing the data rate of communications as compared to conventional twinax cable transmission techniques. In addition, the transmission configuration 600 may also relax the requirements on transceiver performance and cable loss, particularly at lower data rates (e.g., as described above with respect to FIG. 2).

Note that the cutoff frequency for the transmission modes described above is assumed to be zero (e.g., DC). There may be multiple transmission modes at higher frequencies for data transmissions that utilize the conductive shield and at least one of the inner conductors 201 or 202. At higher frequencies, multiple data signals may be transmitted concurrently over cable 210 at different directions of the electrical and magnetic fields. Thus, for some embodiments, one or more of the data transmission techniques described herein may be applied to co-axial ("coax") cables.

For example, in coax cables (and also for the data channel between one of the inner conductors 201 or 202 and conductive shield 203 in twinax cable 210), for data transmitted at low frequencies (e.g., up to a few gigahertz), the corresponding signal wave propagates primarily in the transverse electric magnetic (TEM) mode. This means that the electric and magnetic fields are both perpendicular to the direction of propagation. However, above a certain cutoff frequency, transverse electric (TE) or transverse magnetic (TM) modes may also propagate in a manner similar to that in a waveguide. For conventional data transmission techniques, it is typically undesirable to transmit signals above the cutoff frequency because it may cause multiple modes with different phase velocities to propagate and therefore interfere with one another. However, when using advanced receiver techniques that suppress and cancel such interference, these higher modes may be used to reliably transmit data signals.

It should be noted that the foregoing embodiments are not limited to twinax cables. For example, MIMO transmission techniques described herein may be applied to tri-ax and/or quad-ax cables. Moreover, assuming a cable having N inner conductors, the transmission techniques described herein contemplate transmitting N concurrent data signals by leveraging the conductive shield of the cable as an additional conductor (e.g., as a transmit or return path). For example, the embodiment shown in FIG. 2 may be expanded to transmit N−1 concurrent data signals using the N inner conductors, whereby an additional data signal is further transmitted using the $N^{th}$ inner conductor and the conductive shield. Similarly, the embodiment shown in FIG. 6 may be expanded to transmit N data signals, concurrently, using a respective one of the N inner conductors and the conductive shield to transmit each data signal.

In the embodiments described above, the inner conductors 201 and 202 of the twinax cable 210 may be very close in proximity to one another. Thus, cross-talk may be introduced between the channels when transmitting two streams of data in parallel. However, advanced receiver and/or transmitter techniques may effectively suppress, or even eliminate, such cross-talk. Examples of such receiver-side techniques include successive interference cancellation (SIC) and linear minimum-mean-square-error (LMMSE). In addition, the transmitter may provide a reference signal to the receiver.

More specifically, feedback about the channel conditions and/or the achievable rates of the two signal streams from the receiver 430 to the transmitter 420 may be provided. This feedback may be provided as the packet format to be used by the transmitter 420 and/or as an indicator of the channel quality. The feedback may also contain information about the relative phase between the two streams. The properly chosen relative phase may reduce the inter-stream interference, or the cross-talk between the streams. Under the same channel conditions, receivers 430 with different capabilities (e.g., a SIC receiver and an LMMSE equalizer receiver) may report different achievable rates to the transmitter 420. This may be the case even for the same system and symmetric data signals (e.g., wherein each data signal is transmitted using one inner conductor and the conductive shield) because of the order of decoding performed by the SIC receiver. If the OFDM waveform is used for one or multiple signal streams, wherein the OFDM waveform is composed of multiple sub-bands, the feedback may contain information on the channel quality of each stream and relative phase between the two streams for each sub-band.

Figure 7A:
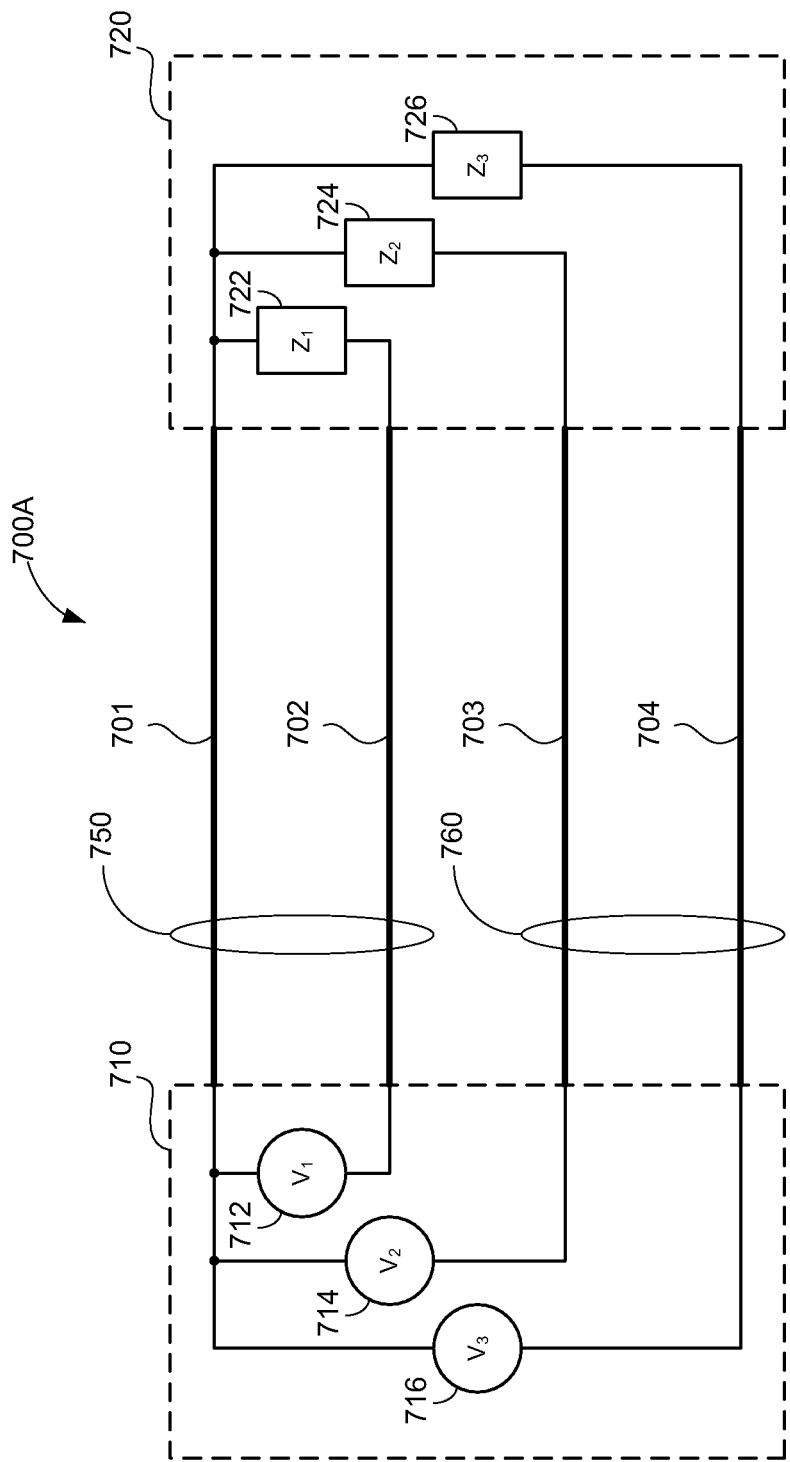
FIGS. 7A-7B illustrate MIMO transmission configurations for a cable including a set of twisted pairs, in accordance with some embodiments.

FIG. 7A illustrates a MIMO transmission configuration 700A for a cable including a set of twisted pairs 750 and 760, in accordance with some embodiments. The first twisted pair 750 includes conductors 701 and 702, and the second twisted pair 760 includes conductors 703 and 704. The twisted pairs 750 and 760 are coupled between a transmitter 710 and a receiver 720. The transmitter 710 includes a number of voltage sources 712, 714, and 716. For some embodiments, the first voltage source 712 is coupled to the conductors 701 and 702, the second voltage source 714 is coupled to the conductors 701 and 703, and the third voltage source 716 is coupled to the conductors 701 and 704. The receiver 720 includes a number of detector circuits 722, 724, and 726. For some embodiments, the first detector 722 is coupled to the conductors 701 and 702, the second detector 724 is coupled to the conductors 701 and 703, and the third detector 726 is coupled to the conductors 701 and 704.

A first set of data signals (e.g., corresponding to a first subset of data) may be generated by the first voltage source 712 and transmitted over the first twisted pair 750 (e.g., via the conductors 701 and 702). More specifically, the first voltage source 712 may apply a first voltage $V_1$ across the conductors 701 and 702. The first voltage $V_1$ is thus translated into the first set of data signals. The first detector 722 may receive the first set of data signals, via the conductors 701 and 702, by detecting the current and/or voltage across a first load impedance $Z_1$. The first detector 722 may then recover the first data stream based on the detected current(s) and/or voltage(s). For some embodiments (e.g., wherein the conductors 701 and 702 are substantially symmetrical), the first subset of data may be transmitted on the twisted pair 750 using differential signaling techniques.

A second set of data signals (e.g., corresponding to a second subset of data) may be generated by the second voltage source 714 and transmitted via the conductors 701 and 703. Specifically, the second voltage source 714 may apply a second voltage $V_2$ across the conductors 701 and 703. The second voltage $V_2$ is thus translated into the second set of data signals. The second detector 724 may receive the second set of data signals, via the conductors 701 and 703, by detecting the current and/or voltage across a second load impedance $Z_2$. The second detector 724 may then recover the second data stream based on the detected current(s) and/or voltage(s). For some embodiments, the second voltage source 714 transmits data signals using one of the conductors of the first twisted pair 750 (i.e., conductor 701) and one of the conductors of the second twisted pair 760 (i.e., conductor 703).

A third set of data signals (e.g., corresponding to a third subset of data) may be generated by the third voltage source 716 and transmitted via the conductors 701 and 704. Specifically, the third voltage source 716 may apply a third voltage $V_3$ across the conductors 701 and 704. The third voltage $V_3$ is thus translated into the third set of data signals. The third detector 726 may receive the third set of data signals, via the conductors 701 and 704, by detecting the current and/or voltage across a third load impedance $Z_3$. The third detector 726 may then recover the third data stream based on the detected current(s) and/or voltage(s). For some embodiments, the third voltage source 716 transmits data signals using the shared conductor of the first twisted pair 750 (i.e., conductor 701) and the remaining the conductor of the second twisted pair 760 (i.e., conductor 704).

Because the conductor 701 is shared by (i.e., coupled to) all three voltage sources 712, 714, and 716, the voltage level of the conductor 701 may be used as a common reference voltage by each of the voltage sources 712, 714, and 716 for generating their respective data signals. For some embodiments, the conductor 701 may be grounded. For other embodiments, the transmitter 710 may include circuitry to selectively control each of the voltage sources 712, 714, and 716 to ensure that the transmission of data by one voltage source does not interfere with the transmission of data by any of the other voltage sources.

Treating the conductors 701-704 as individual transmission lines provides an additional degree of freedom (e.g., allowing up to 3 data signals to be transmitted in parallel) as compared to, for example, conventional twisted pair transmission techniques. Furthermore, architectural similarities between twisted pairs cables described herein and prior art embodiments may enable the present embodiments to be readily applied to legacy networks that employ conventional twisted-pair cables (e.g., Category 5 and/or Category 6 cables).

In the embodiments described above, the conductors 701-704 of the twisted pairs 750 and 760 may be very close in proximity to one another. Thus, cross-talk may be introduced between the channels when transmitting multiple streams of data in parallel. Furthermore, signal reflections may also be introduced at the connections between the conductors 701-704 and the transmitter 710 and/or receiver 720. Thus, for some embodiments, the transmitter 710 and/or receiver 720 may include impedance matching circuitry to mitigate such sources of signal interference.

Figure 7B:
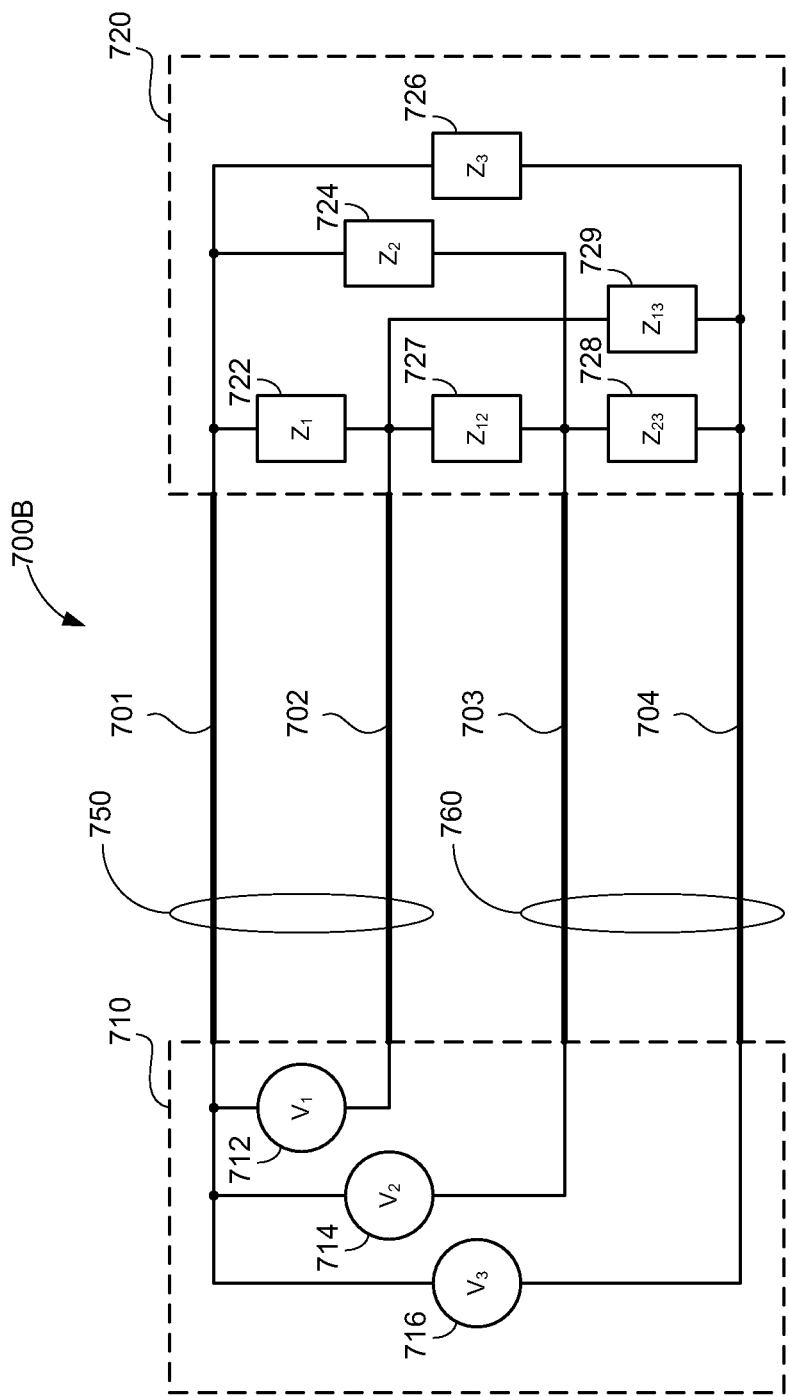

For example, as shown in the configuration 700B of FIG. 7B, the receiver 720 may include additional load impedances 727-729 that can be used to mitigate reflections and/or crosstalk in the conductors 701-704. Specifically, the load 727 has an impedance value of $Z_{12}$ and is coupled between the conductors 702 and 703, the load 728 has an impedance value of $Z_{23}$ and is coupled between the conductors 703 and 704, and the load 729 has an impedance value of $Z_{13}$ and is coupled between the conductors 702 and 704. These load impedances 727-729, in conjunction with the impedances associated with the detector circuits 722, 724, and 726, can be used to match the impedance of the receiver 720 to the input impedances associated with the conductors 701-704.

In addition to impedance matching, advanced receiver and/or transmitter techniques may effectively suppress, or even eliminate, cross-talk between conductors. Examples of such receiver-side techniques include successive interference cancellation (SIC) and linear minimum-mean-square-error (LMMSE). In addition, the transmitter 710 may provide a reference signal to the receiver 720 for purposes of detecting and mitigating external noise or interference.

It should be noted that the present embodiments have been described with respect to cables composed of two twisted pairs (e.g., twisted pairs 750 and 760) for simplicity only. The enhanced MIMO transmission techniques described herein can be readily applied across any N number of twisted pairs. For example, the configurations 700A and 700B can be easily expanded to transmit 2N−1 data streams across N twisted pairs (e.g., using the 2N individual conductors that comprise the N twisted pairs, wherein one of the conductors is shared). Moreover, the N twisted pairs may be physically packaged into one or multiple cables.

Figure 8:
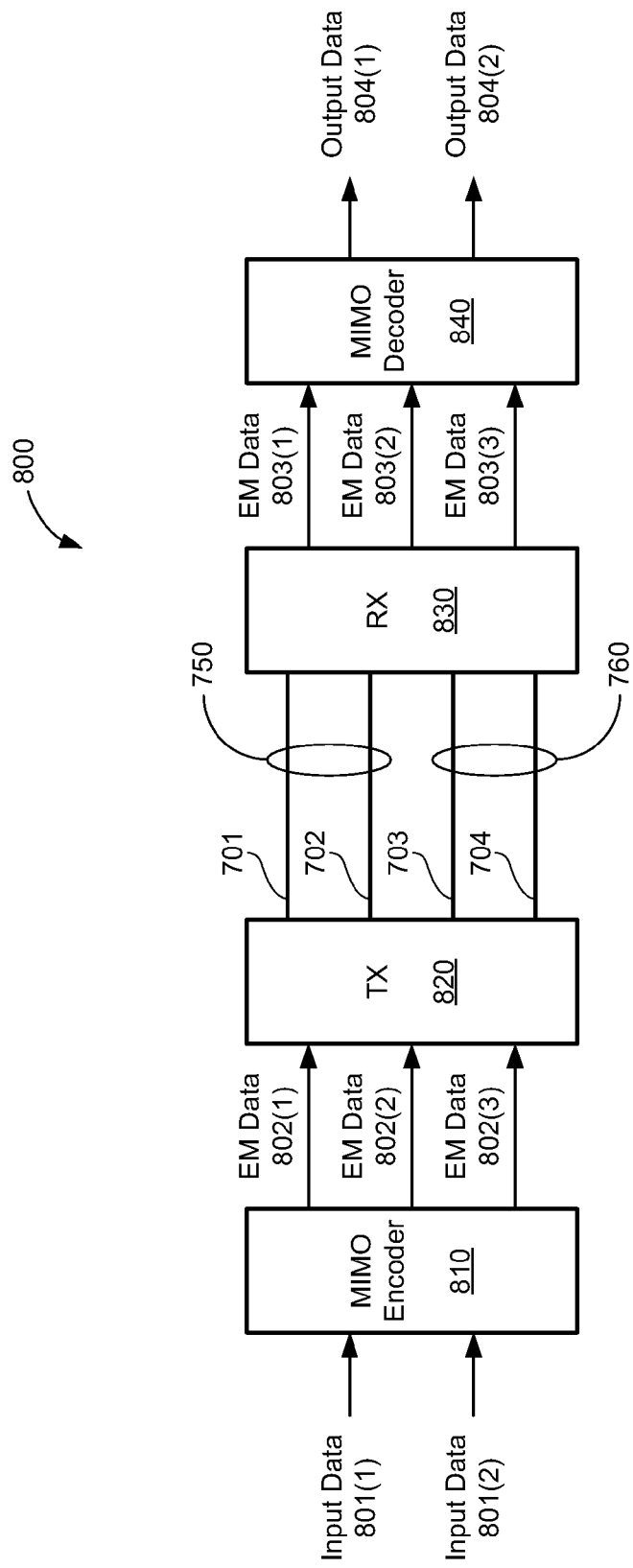
FIG. 8 is a block diagram illustrating an embodiment of a MIMO data transmission system employing twisted pairs.
Figure 9A:
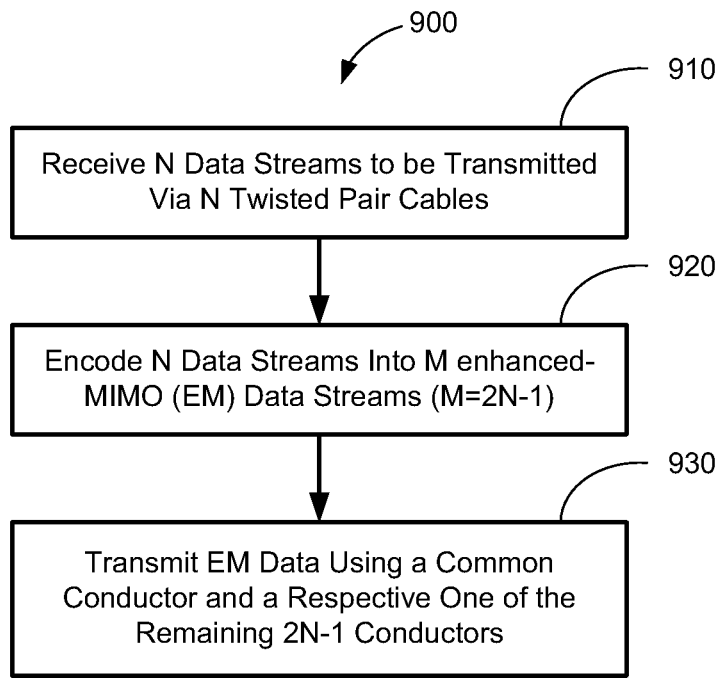
FIGS. 9A-9B are illustrative flow charts depicting exemplary operations for exchanging MIMO signals over a cable including a set of twisted pairs, in accordance with some embodiments.
Figure 9B:
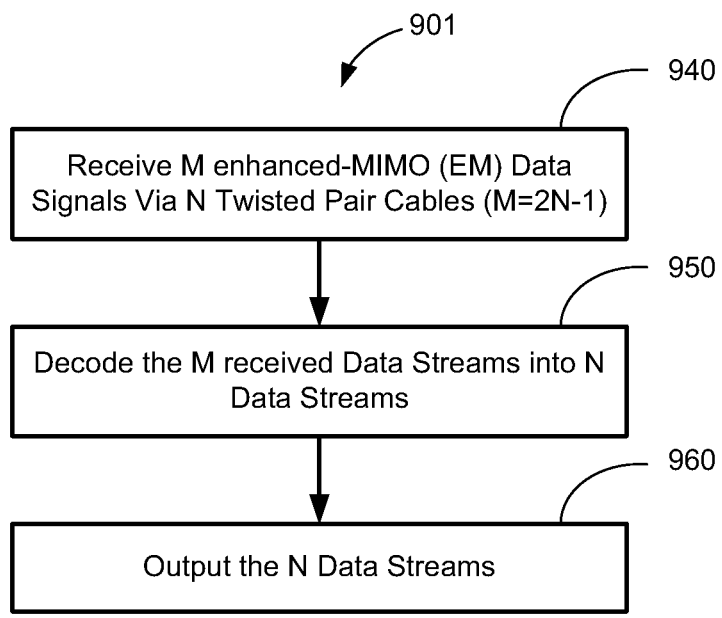

FIG. 8 is a block diagram illustrating an embodiment of a MIMO data transmission system 800 employing twisted pairs. The system 800 includes a MIMO encoder 810, a transmitter 820, a receiver 830, and a MIMO decoder 840. Twisted pairs 750 and 760 are coupled between the transmitter 820 and the receiver 830. FIGS. 9A-9B are illustrative flow charts depicting exemplary operations 900 and 901 for exchanging enhanced MIMO signals over a set of twisted pairs in accordance with some embodiments. FIGS. 9A-9B are described below with reference to the system 800 of FIG. 8.

The MIMO encoder 810 initially receives N data streams of input data 801 to be transmitted via N twisted pairs (910). In a particular example, the MIMO encoder 810 may receive two data streams 801(1) and 801(2) that are intended to be transmitted over the twisted pairs 750 and 760, respectively. For some embodiments, each of the N data streams may correspond to a differential data signal that is intended to be transmitted via a respective one of the N twisted pairs (e.g., using differential signaling). The MIMO encoder 810 then encodes (e.g., converts) the N data streams into M number of enhanced-MIMO (EM) data streams (920). For some embodiments, M=2N−1. For example, the MIMO encoder 810 may encode the two received data streams 801(1) and 801(2) into three EM data streams 802(1)-802(3).

The transmitter 820 transmits the EM data using a common conductor and a respective one of the remaining 2N−1 conductors (930). More specifically, the transmitter 820 may generate data signals representing the EM data by applying a corresponding number of voltages across the conductors 701-704. For some embodiments, the voltage level of one of the conductors 701-704 may be used as a common reference potential for biasing the remaining three conductors. For example, the transmitter 820 may transmit three EM data streams 802(1)-802(3) by applying respective voltage biases between the conductor 701 and each of the remaining conductors 702-704.

The receiver 830 receives M number of EM data signals via the N twisted pairs (940). More specifically, the receiver 830 may recover M number of EM data streams by detecting (e.g., sampling) the currents and/or voltages transmitted across the conductors 701-704. For some embodiments, the voltage level of one of the conductors 701-704 may be used as a reference potential for determining the voltages on the remaining three conductors. For example, the receiver 830 may receive three EM data streams 803(1)-803(3) by detecting respective voltage differences between the conductor 701 and each of the remaining conductors 702-704.

The MIMO decoder 840 decodes (e.g., converts) the M received data streams into its original form, as N number of data streams (950), and outputs the decoded data streams for further processing (960). For example, the MIMO decoder 840 may receive three parallel streams of EM data 803(1)-803(3) that represent two original data streams 804(1) and 804(2). In other words, the three EM data streams 803(1)-803(3) were originally intended to be transmitted as only two separate streams of data. The MIMO decoder 840 may thus reconstruct the original two data streams 804(1) and 804(2) from which the three EM data streams 803(1)-803(3) were encoded.

Note that, in some embodiments, transmitter 820 and receiver 830 may be substituted for transceivers that are configured to both transmit and receive data signals over the conductors 701-704 (i.e., transceivers). Such a configuration may allow for bidirectional communications via the conductors 701-704. Furthermore, the system 800 described above may be implemented by replacing or adding additional circuitry to the front end of many legacy twisted-pair cable (e.g., Cat 5 and/or Cat 6) applications. Accordingly, the system 800 may provide a low-cost alternative for increasing the data rate of existing twisted pair-based communication systems.

Figure 10:
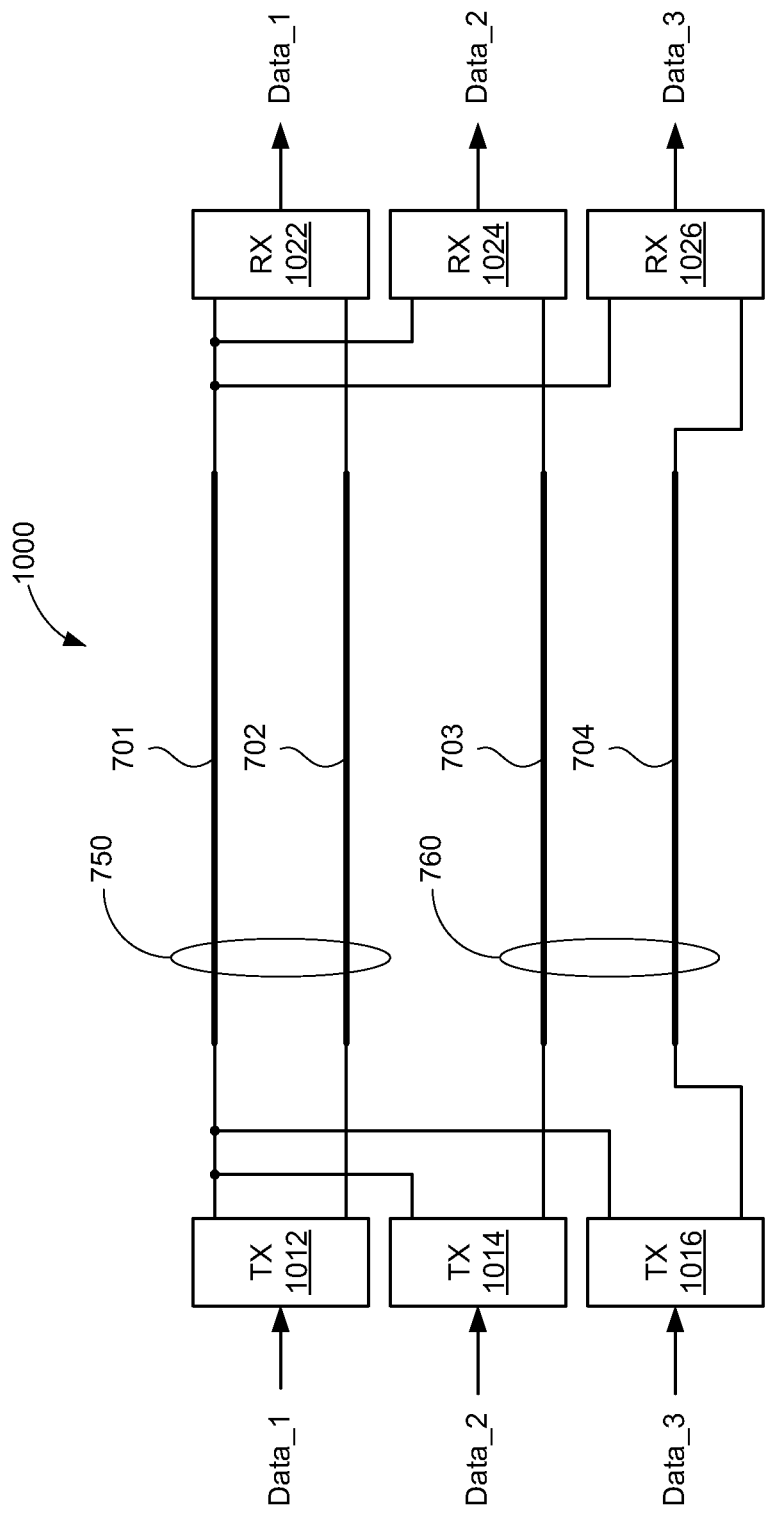
FIG. 10 is a block diagram illustrating a more detailed embodiment of the MIMO data transmission system shown in FIG. 8.

FIG. 10 is a block diagram illustrating a more detailed embodiment of the MIMO data transmission system 800 shown in FIG. 8. The system 1000 includes a number of transmitters 1012, 1014, and 1016 coupled to one end of twisted pairs 750 and 760, and a number of receivers 1022, 1024, and 1026 coupled to the other end of the twisted pairs 750 and 760. Specifically, the first transmitter 1012 and the first receiver 1022 are coupled to conductors 701 and 702, the second transmitter 1014 and the second receiver 1024 are coupled to conductors 701 and 703, and the third transmitter 1016 and the third receiver 1026 are coupled to conductors 701 and 704.

In operation, the transmitters 1012, 1014, and 1016 receive data streams Data_1, Data_2, and Data_3, respectively, and output data signals representing the received data streams via the conductors 701-704. For example, the data streams Data_1, Data_2, and Data_3 may correspond to EM data streams encoded by a MIMO encoder (not shown). For some embodiments, each of the transmitters 1012, 1014, and 1016 may correspond to a transformer (e.g., balun transformer) that is capable of converting the received data stream onto a set of twisted-pair cable conductors. For example, the first transmitter 1012 may transmit the data stream Data_1 via the conductors 701 and 702, the second transmitter 1014 may transmit the data stream Data_2 via the conductors 701 and 703, and the third transmitter 1016 may transmit the data stream Data_3 via the conductors 701 and 704.

The receivers 1022, 1024, and 1026 are configured to recover the data streams Data_1, Data_2, and Data_3, respectively, by sampling the data signals carried by the conductors 701-704. For some embodiments, each of the receivers 1022, 1024, and 1026 may correspond to a transformer that is capable of converting a data signal received over a set of twisted-pair cable conductors to a corresponding data stream. For example, the first receiver 1022 may recover the data stream Data_1 from the conductors 701 and 702, the second receiver 1024 may recover the data stream Data_2 from the conductors 701 and 703, and the third receiver 1026 may recover the data stream Data_3 from the conductors 701 and 704.

Figure 11:
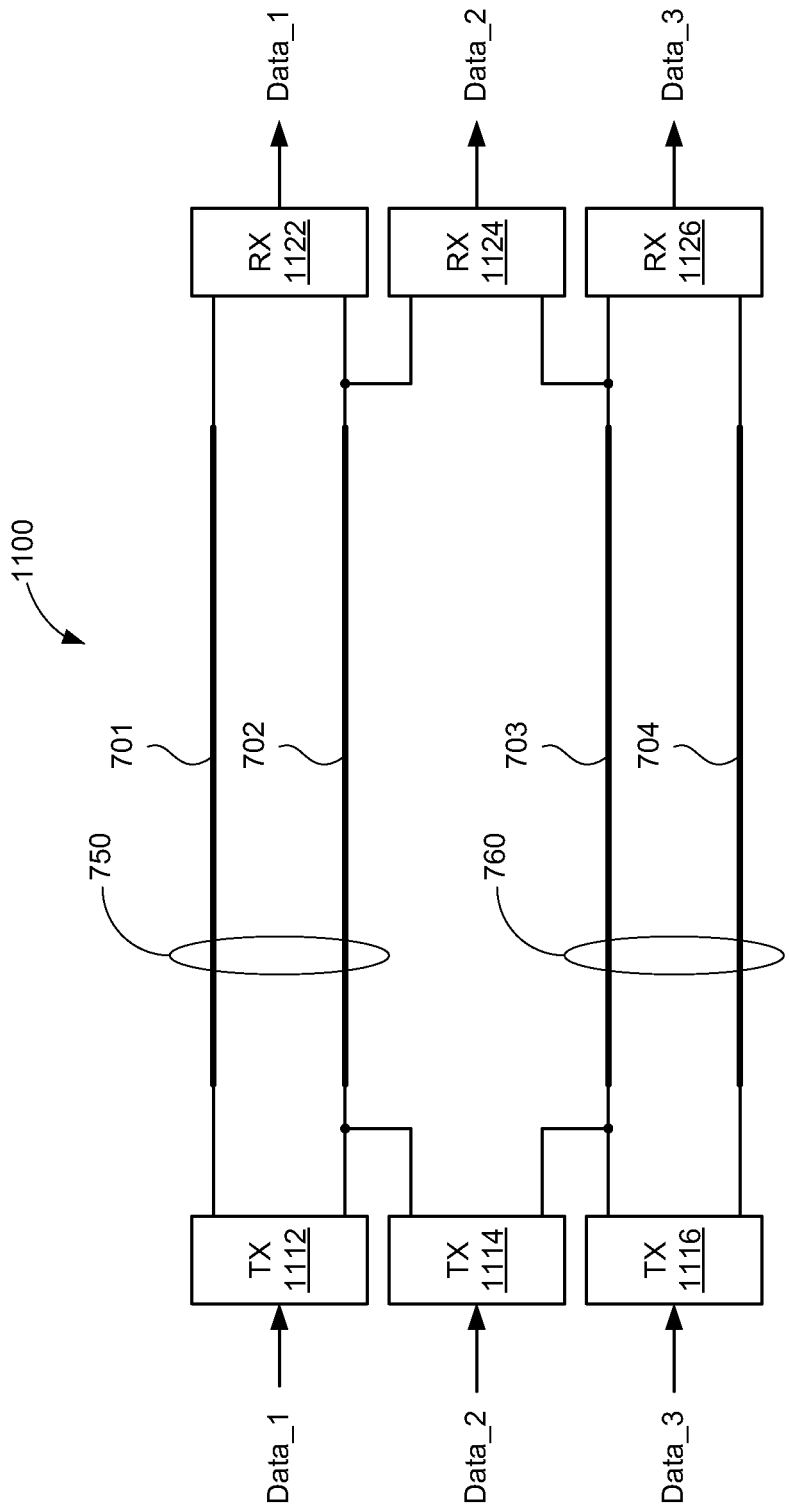
FIG. 11 is a block diagram illustrating another embodiment of the MIMO data transmission system shown in FIG. 8.

FIG. 11 is a block diagram illustrating another embodiment of the MIMO data transmission system 800 shown in FIG. 8. More specifically, the system 1100 represents an alternative configuration for the system 1000 shown in FIG. 10. For example, the system 1100 includes a first transmitter 1112 and a first receiver 1122 coupled to conductors 701 and 702, a second transmitter 1114 and a second receiver 1124 coupled to conductors 702 and 703, and a third transmitter 1116 and a third receiver 1126 coupled to conductors 703 and 704.

As described above, with reference to FIG. 10, each of the transmitters 1112, 1114, and 1116 and the receivers 1122, 1124, and 1126 may correspond to a transformer. Specifically, the first transmitter 1112 may transmit the data stream Data_1 via the conductors 701 and 702, the second transmitter 1114 may transmit the data stream Data_2 via the conductors 702 and 703, and the third transmitter 1116 may transmit the data stream Data_3 via the conductors 703 and 704. Similarly, the first receiver 1122 may recover the data stream Data_1 from the conductors 701 and 702, the second receiver 1124 may recover the data stream Data_2 from the conductors 702 and 703, and the third receiver 1116 may recover the data stream Data_3 from the conductors 703 and 704.

It should be noted that, in contrast with the system 1000 shown in FIG. 10, no single conductor 701-704 is used as a common reference potential for the remaining conductors in the system 1100.

Figure 12:
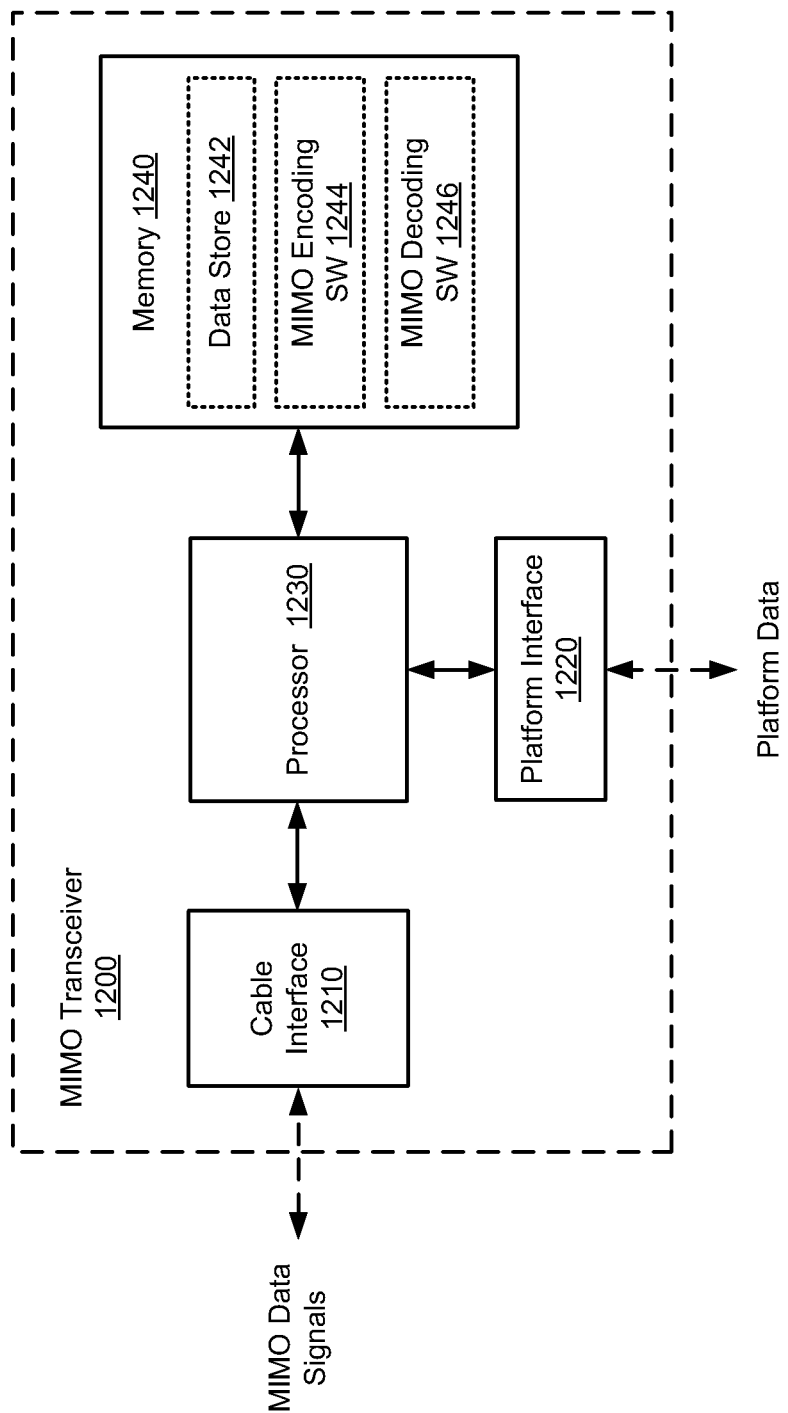
FIG. 12 is a block diagram of a MIMO transceiver in accordance with some embodiments.

FIG. 12 is a block diagram of a MIMO transceiver 1200 in accordance with some embodiments. The transceiver 1200 includes a cable interface 1210, a platform interface 1220, a local processor 1230, and a memory 1240. The cable interface 1210 is coupled to the processor 1230 and may be used to transmit and/or receive data signals over a data cable (e.g., twinax or twisted pair) in a manner prescribed by the processor 1230. The platform interface 1220 is also coupled to the processor 1230 and may be used to communicate data to and/or from a computing platform (e.g., via a PCIe link).

Memory 1240 may include a data store 1242 that may be used to temporarily buffer data to be encoded and/or decoded. Furthermore, memory 1240 may also include a non-transitory computer-readable storage medium (e.g., one or more nonvolatile memory elements, such as EPROM, EEPROM, Flash memory, a hard drive, etc.) that can store the following software modules:

a MIMO encoding module 1244 to encode outgoing data for MIMO-based transmission over a data cable; and a MIMO decoding module 1246 to decode MIMO-encoded data signals received over the data cable.

Each software module may include instructions that, when executed by the local processor 1230, may cause the transceiver 1200 to perform the corresponding function. Thus, the non-transitory computer-readable storage medium of memory 1240 may include instructions for performing all or a portion of the operations described with respect to FIGS. 5 and 9A-9B.

The local processor 1230, which is coupled to the memory 1240, may be any suitable processor capable of executing scripts of instructions of one or more software programs stored in the transceiver 1200 (e.g., within memory 1240). For example, the processor 1230 can execute the MIMO encoding module 1244 and/or the MIMO decoding module 1246.

The MIMO encoding module 1244 may be executed by the local processor 1230 to encode data signals to be transmitted over the data cable. For example, the MIMO encoding module 1244, as executed by the local processor 1230, may receive a set of data (e.g., from the computing platform) to be transmitted via the data cable, and encodes the data set to produce multiple subsets of data. For some embodiments, the processor 1230, in executing the MIMO encoding module 1244, may partition the received data set to be transmitted over the data cable as a plurality of separate and/or parallel sets of data signals. The processor 1230, in executing the MIMO encoding module 1244, may then transmit the data signals on the data cable such that at least one conductive element of the data cable is used in the transmission of two or more of data signals, concurrently (e.g., as described above with respect to FIGS. 5 and 9A-9B).

The MIMO decoding module 1246 may be executed by the local processor 1230 to decode data received from a data cable. For example, the MIMO decoding module 1246, as executed by the local processor 1230, may receive a plurality of data signals, in parallel, over the data cable, and decodes the data signals to recover the originally-transmitted data set. For some embodiments, the processor 1230, in executing the MIMO decoding module 1246, may receive the data signals by sampling the voltages across each of the conductive elements of the data cable, wherein the voltage of at least one of the conductive elements is used as a common reference potential for determining the voltages associated with two or more data signals (e.g., as described above with respect to FIGS. 5 and 9A-9B). The processor 1230, in executing the MIMO decoding module 1246, may then combine the received data signals in accordance with the encoding algorithm used by the MIMO encoding module 1244 to recover the original data set.

The various signal transmission techniques described herein with respect to the exemplary embodiments may provide higher data rates for data cables than conventional data transmission techniques. In addition, at least some of the present embodiments may allow for more relaxed requirements on transceiver performance and/or cable loss when transmitting at lower data rates. The present embodiments may be implemented in legacy data communications systems with little modification to the existing hardware infrastructure.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, the method steps depicted in the flow charts of FIGS. 5 and 9A-9B may be performed in other suitable orders, multiple steps may be combined into a single step, and/or some steps may be omitted.

What is claimed is:

1. A method of data communication over a cable including at least a first inner conductor, a second inner conductor, and an outer conductive shield, the method comprising:
    transmitting a first data signal using the conductive shield and the first inner conductor without using the second inner conductor; and
    transmitting a second data signal using at least the second inner conductor.

2. The method of claim 1, wherein the first and second data signals are transmitted concurrently.

3. The method of claim 1, wherein transmitting the second data signal comprises:
    transmitting the second data signal using the first and second inner conductors.

4. The method of claim 3, wherein the second data signal is a differential signal, and wherein the first data signal is a single-ended signal.

5. The method of claim 3, wherein the first data signal is transmitted by applying a first voltage differential between the conductive shield and the first inner conductor, and wherein the second data signal is transmitted by applying a second voltage differential between the first and second inner conductors.

6. The method of claim 1, wherein transmitting the second data signal comprises:
    transmitting the second data signal using the conductive shield and the second inner conductor.

7. The method of claim 6, wherein the first and second data signals are single-ended signals.

8. The method of claim 7, wherein the first data signal is transmitted by applying a first voltage differential between the conductive shield and the first inner conductor, and wherein the second data signal is transmitted by applying a second voltage differential between the conductive shield and the second inner conductor.

9. The method of claim 1, further comprising:
    receiving a set of data intended for transmission via the first and second inner conductors;
    partitioning the set of data into a first subset of data and a second subset of data; and
    generating the first and second data signals based on the first and second subsets of data, respectively.

10. A method of data communication over a cable including at least a first inner conductor, a second inner conductor, and an outer conductive shield, the method comprising:
    receiving a first data signal via the conductive shield and the first inner conductor and not the second inner conductor; and
    receiving a second data signal using at least the second inner conductor.

11. The method of claim 10, wherein the first and second data signals are received concurrently.

12. The method of claim 10, wherein receiving the second data signal comprises:
    receiving the second data signal via the first and second inner conductors.

13. The method of claim 12, wherein the second data signal is a differential signal, and wherein the first data signal is a single-ended signal.

14. The method of claim 12, wherein the first data signal is received by detecting a first voltage differential between the conductive shield and the first inner conductor, and wherein the second data signal is received by detecting a second voltage differential between the first and second inner conductors.

15. The method of claim 10, wherein receiving the second data signal comprises:
receiving the second data signal via the conductive shield and the second inner conductor.

16. The method of claim 15, wherein the first and second data signals are single-ended signals.

17. The method of claim 16, wherein the first data signal is received by detecting a first voltage differential between the conductive shield and the first inner conductor, and wherein the second data signal is received by detecting a second voltage differential between the conductive shield and the second inner conductor.

18. The method of claim 10, further comprising:
decoding the first data signal and the second data signal to recover a first subset of data and a second subset of data, respectively; and
combining the first subset of data and the second subset of data to produce a single data stream.

19. A communications device, comprising:
an encoder coupled to a cable, the cable including at least a first inner conductor, a second inner conductor, and an outer conductive shield, wherein the encoder is to:
transmit a first data signal using the conductive shield and the first inner conductor without using the second inner conductor; and
transmit a second data signal using at least the second inner conductor.

20. The device of claim 19, wherein the encoder is to transmit the first and second data signals concurrently.

21. The device of claim 19, wherein the encoder is to transmit the second data signal using the first and second inner conductors, wherein the second data signal is a differential signal, and wherein the first data signal is a single-ended signal.

22. The device of claim 21, wherein the encoder is to transmit the first data signal by applying a first voltage differential between the conductive shield and the first inner conductor, and wherein the encoder is to transmit the second data signal by applying a second voltage differential between the first and second inner conductors.

23. The device of claim 19, wherein the encoder is to transmit the second data signal using the conductive shield and the second inner conductor, and wherein the first and second data signals are single-ended signals.

24. The device of claim 19, wherein the encoder is to further:
receive a set of data intended for transmission via the first and second inner conductors;
partition the set of data into a first subset of data and a second subset of data; and
generate the first and second data signals based on the first and second subsets of data, respectively.

25. A communications device, comprising:
a decoder coupled to a cable, the cable including at least a first inner conductor, a second inner conductor, and an outer conductive shield, wherein the decoder is to:
receive a first data signal via the conductive shield and the first inner conductor and not the second inner conductor; and
receive a second data signal via at least the second inner conductor.

26. The device of claim 25, wherein the decoder is to receive the first and second data signals concurrently.

27. The device of claim 25, wherein the decoder is to receive the second data signal via the first and second inner conductors, wherein the second data signal is a differential signal, and wherein the first data signal is a single-ended signal.

28. The device of claim 27, wherein the decoder is to receive the first data signal by detecting a first voltage differential between the conductive shield and the first inner conductor, and wherein the decoder is to receive the second data signal by detecting a second voltage differential between the first and second inner conductors.

29. The device of claim 25 wherein the decoder is to receive the second data signal via the conductive shield and the second inner conductor, and wherein the first and second data signals are single-ended signals.

30. The device of claim 25, wherein the decoder is to further:
decode the first data signal and the second data signal to recover a first subset of data and a second subset of data, respectively; and
combine the first subset of data and the second subset of data to produce a single data stream.

* * * * *